July 13, 1971 KEIZO HONBO 3,592,609
APPARATUS FOR CONTINUOUSLY PRODUCING CHROMIC ANHYDRIDE
Filed Feb. 12, 1969

INVENTOR
Keizo Honbo
BY Cushman, Darby & Cushman
ATTORNEYS

United States Patent Office 3,592,609
Patented July 13, 1971

3,592,609
APPARATUS FOR CONTINUOUSLY PRODUCING CHROMIC ANHYDRIDE
Keizo Honbo, Hokkaido, Japan, assignor to Nippon Denko Co., Ltd., Tokyo, Japan
Filed Feb. 12, 1969, Ser. No. 798,695
Claims priority, application Japan, Feb. 17, 1968, 43/9,721
Int. Cl. B01j 1/00; C01g 37/02; B01d 1/24
U.S. Cl. 23—260     3 Claims

ABSTRACT OF THE DISCLOSURE

Apparatus adapted for use in producing chromic anhydride which comprises a stationary cylindrical casing of the externally heated type provided with a jacket in which a high-speed rotary conveyer for forcibly moving an alkali metal dichromate forwardly, a high-speed rotary kneader for mixing and kneading said alkali metal dichromate and sulfuric acid to cause them to react with each other and produce a reaction product while moving them forwardly, and a high-speed rotary centrifugal continuous evaporator adapted to form a thin film of said reaction product on cylindrical inner walls to forcibly effect deaeration of the same, are arranged in the indicated order in end to end relation. In the reactor described above, a stationary cylindrical casing section housing said high speed rotary centrifugal continuous evaporator therein may be formed integrally as a unit with a conveying and reaction stationary cylindrical casing section housing said high speed rotary conveyer and said high speed rotary kneader in alignment with the latter section or the said two stationary cylindrical sections may be formed as independent units.

---

Figure 3:
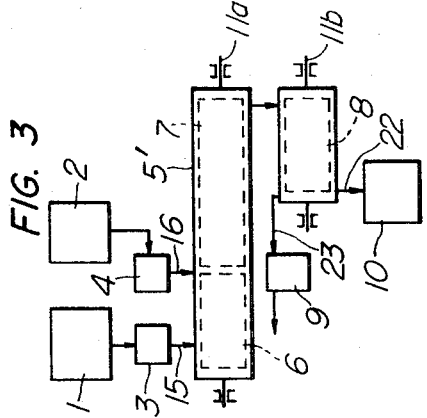

The present invention relates to apparatus for continuously producing chromic anhydride by the dry process, and in particular the invention is concerned with improvements in a reactor adapted for use in the apparatus which forms the most important part of the apparatus.

In one method well-known in the art of producing chromic anhydride, an alkali metal dichromate, such as sodium dichromate, and sulfuric acid are caused to react with each other to produce a mixture of chromic anhydride and sodium hydrogen sulfate from which chromic anhydride is obtained by separation. It is also well known that this method can be divided into a dry process and a wet process.

An apparatus for continuously producing chromic anhydride by the dry process is disclosed in Japanese Patent No. 430,082. In the apparatus of this patent, a mixer which has no heating device produces a reaction product which is in the form of a slurry of high tackiness because of the heat of the reaction to which the raw materials are subjected. The flow of the reaction product is liable to be obstructed by its high tackiness because it adheres to a vibratory chute which is the supply means for delivering the reaction product to a succeeding rotary reaction cylinder for heating the same. Also, if the rate of elevation of temperature is too high in heating the reaction product in the rotary cylinder, overheating occurs locally in some portions of the reaction product and the chromic anhydride decomposes, resulting in a reduced yield of chromium. In addition, heating the reaction product for several minutes is not enough to generate water vapor and chlorine gas in an amount sufficient to prevent bubbling of the reaction product in a separator tank in the next treatment, making it difficult to completely separate chromic anhydride. An added disadvantage when the process is carried into practice as a commercial undertaking lies in the fact that since the cylinder having heating surfaces is rotated, heat conducting surfaces must be made as large as possible and drive means of a large scale must be provided if fusion and deaeration are to be effected as desired.

Accordingly, the present invention has as its object the provision of a novel reactor for producing chromic anhydride which obviates the aforementioned disadvantages of conventional reactors and ensures that pure chromic anhydride is definitely produced.

According to the present invention, there is provided a reactor adapted for use in apparatus for continuously producing chromic anhydride by reacting an alkali metal dichromate with sulfuric acid to produce a reaction product and separating chromic anhydride from said reaction product, such reactor comprising a reaction cylinder including a stationary cylindrical casing adapted to be heated externally and provided with an alkali metal dichromate supply port and a sulfuric acid supply port, a high-speed rotary conveyer for forcibly moving the alkali metal dichromate forwardly, and a high speed rotary kneader adapted to mix and knead the alkali metal dichromate and sulfuric acid while moving the same forwardly, said high speed rotary kneader being arranged downstream of said high speed rotary conveyer in end to end relationship therewith in said stationary cylindrical casing, said alkali metal dichromate supply port opening to the high speed conveyer, said sulfuric acid supply port opening to the high speed rotary kneader, and a high speed rotary centrifugal continuous evaporator housed in a stationary cylindrical casing connected to the downstream end of said reaction cylinder and adapted to be heated externally to form a thin film of the reaction product on cylindrical inner walls, said last mentioned stationary cylindrical casing housing said centrifugal evaporator therein being provided on its upstream end with a reaction product inlet connected to a reaction product outlet of said reaction cylinder and on its downstream end with a reaction product discharge port and an exhaust port communicating with an exhauster.

The reactor embodying the present invention offers many advantages. Since the reactor as a whole is heated uniformly from outside, no local overheating occurs when the raw materials are allowed to react with each other while being heated. Moreover, the reactor is constructed such that the raw materials can be moved through the reactor at high speed so that they can react with each other in a short interval of time and the reaction product can be deaerated soon after the reaction is completed, thereby substantially eliminating loss of chromic anhydride due to its decomposition. In addition, water vapor, chlorine gas and other volatile harmful gases are removed from the reaction product in the centrifugal evaporator, so that bubbling of the reaction product in the separator tank can be prevented and separation of chromic anhydride can be effected with a high efficiency. This permits to produce chromic anhydride of high purity.

The advantages offered by the present invention as viewed from an operational point of view are as follows: The arrangement in which the alkali metal dichromate supply port and the sulfuric acid supply port are spaced apart from each other and the rotary conveyer heated externally is interposed between the two supply ports makes it possible to fully dry the alkali metal dichromate while moving the same forwardly before it is brought into contact with sulfuric acid, so that the former can be supplied continuously without causing any obstruction for a prolonged period. The provision of the high-speed rotary kneader for allowing the alkali metal dichromate and sulfuric acid to react with each other therein makes it possible to violently agitate the two materials while they are subjected to high shearing stresses, so that the difficulty of the reaction product becoming adhered to and forming scales on the inner walls of the cylindrical reactor can be eliminated even if a change occurs in the viscosity of the reaction product. This facilitates the carrying on of a stable operation for a prolonged period. During the operation, gases generated in the reactor can be vented to the outside through the exhauster connected to the reactor on its downstream side, so that the danger of operators being exposed to harmful gases leaking from the reactor can be precluded.

The specific structural relationships of the present invention offer the following advantages: Since the conveyor, kneader and evaporator are rotated at high-speed and these rotary members are arranged in end to end relation in one or two stationary cylindrical casings adapted to be heated externally, the raw materials and reaction product are moved forwardly from the entrance to the exit of the reactor while the raw materials are caused to react with each other and the reaction product is deaerated. Thus, the reactor embodying this invention can be made much simpler in construction than conventional reactors. Particularly, when the reactor as a whole is housed, in one cylindrical casing and a rotary shaft is mounted in said cylindrical casing in the center and lengthwise thereof for arranging rotary members in end to end relation thereon, it is possible to provide a reactor which is very simple in construction and occupies very little space.

In summary, the present invention resides in a reactor which comprises a stationary cylindrical casing adapted to be heated externally in which a conveyer for forcibly moving an alkali metal dichromate forwardly, a kneader permitting said alkali metal dichromate and sulfuric acid to react with each other therein, and a centrifugal evaporator adapted for forming a thin film of the reaction product on cylindrical inner walls to forcibly effect deaeration of the reaction product are arranged in end to end relation under negative pressure. The invention can achieve the marked results of permitting the raw materials to be completely fused and the reaction product to be deaerated without any trouble which reaction product is passed through different plastifying stages during the heating process and tends to become adhered to and form scales on cylindrical inner walls of the reactor as well as to decompose if the reaction takes place in conventional reactors.

Figure 1:
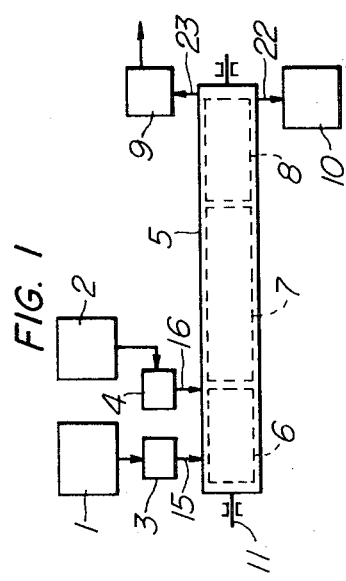
Figure 2:
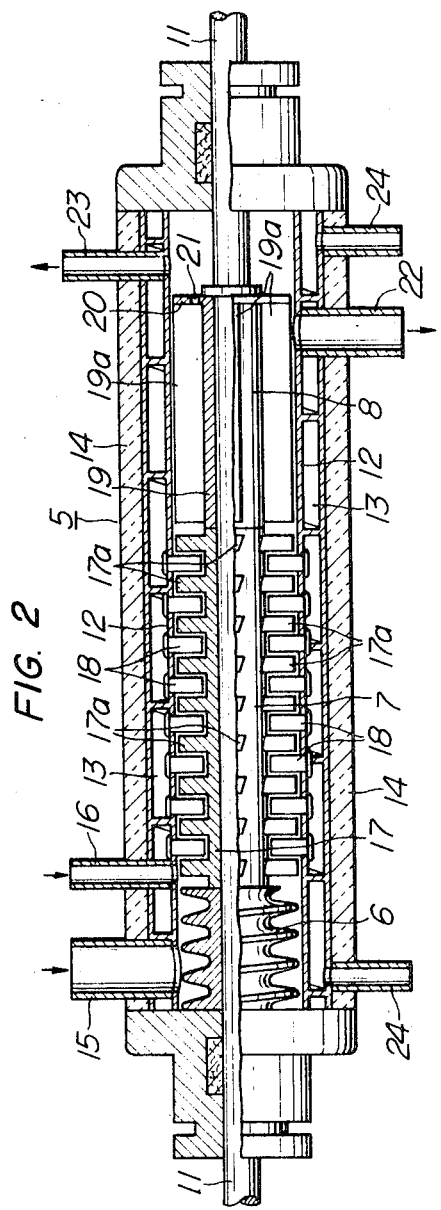

Other objects and advantages of the invention will become apparent from the description set forth hereunder when considered in conjunction with the accompanying drawings, in which:

FIG. 1 is a view to explain the arrangement of the reactor according to one embodiment of this invention in an apparatus for continuously producing chromic anhydride;

FIG. 2 is a front view of one embodiment of the reactor according to this invention as shown in FIG. 1, with the upper half of the reactor being shown in longitudinal section taken through the center of the reactor and the lower half thereof being shown in longitudinal section taken through the center of a double-layer cylinder defining a heating medium chamber and an adiabatic outer cylindrical member; and FIG. 3 is a view to explain the arrangement of the reactor according to another embodiment of this invention.

FIGS. 1 and 2 show an embodiment of the invention in which the reactor is disposed in one stationary cylindrical casing. 1 and 2 refer to an alkali metal dichromate tank and a sulfuric acid tank respectively. 3 and 4 designate devices for supplying a predetermined quantity of the material for 1 and 2 respectively. The reactor generally designated 5 is shown as including a high-speed rotary conveyor of the screw type 6, a high-speed rotary kneader 7 of the construction subsequently to be described, and a centrifugal continuous evaporator 8 of the type adapted to form a thin film of a reaction product on cylindrical inner walls, said conveyer, said kneader and said evaporator being arranged in end to end relation as a unit. 9 is an exhaust pump for deaerating from the reactor. 10 is a tank for separating chromic anhydride from an acidic alkali metal sulfate. 11 is a driving shaft operated from outside by an electric motor for rotating the rotary members of the reactor 5 as a unit. 12 is a stationary cylindrical casing which defines the reactor 5 and provides cylindrical inner walls to the reactor. 13 is a spiral jacket disposed outwardly of the cylindrical casing 12 and permitting a heating medium to pass therethrogh. 14 is an outer heat insulating cylindrical member for preventing the escape of heat. 15 and 16 are supply pipes for the alkali metal dichromate and sulfuric acid separately. As shown in FIG. 2, the alkali metal dichromate supply pipe opens to the high speed rotary conveyor 6, and the sulfuric acid supply pipe opens to the high seed rotary kneader 7 at the position at which the forward end of said rotary kneader is located. 17a refers to pins projecting from a rotor 17 of the kneader keyed to the shaft 11. 18 refers to pins projecting inwardly from the inner walls of the cylindrical casing 12, 19a refers to blades of the centrifugal continuous evaporator, and 20 is an end plate of the evaporator. 21 is an exhaust port provided on the end plate. 22 is a discharge pipe for the reaction product. 23 is an exhaust pipe. 24 designates inlet and outlet pipes for the heating medium.

FIG. 3 shows another embodiment of the invention in which a stationary cylindrical casing section housing the centrifugal continuous evaporator therein is formed independently of a stationary cylindrical casing section housing the conveyor and the kneader therein. The latter casing section is the conveying and reaction section 5' and the former casing section is the evaporator section 8. There are provided two driving shafts 11a and 11b in place of the one driving shaft 11. The two cylindrical casing sections may be connected to each other in any way desired, either at right angles, in parallel or obliquely to each other. In both of the two embodiments illustrated, the raw materials, reaction product and gases are either supplied, moved or discharged in the direction of respective arrows. In the drawings, like reference numbers designate similar parts in all the drawings.

The high-speed rotary conveyor 6 may be of the ribbon type instead of the screw type as illustrated because it is intended to convey a powdered material.

The kneader 7 includes a number of pins 17a mounted on the rotor 17 and arranged axially a plurality of rows so as to project in several directions radially therefrom in such a manner that as they are rotated, they pass between the pins 18 mounted on the inner walls of the stationary cylindrical casing 12 at regular intervals and projecting inwardly therefrom. The pins 17a are each formed with a surface inclined with respect to the axis of rotation of the rotor 17 so that the materials can be moved forwardly simultaneously as they are kneaded. When the rotating pins 17a pass between the fixed pins 18, the kneaded materials are subjected to high shearing stresses so that the materials of high viscosity can be dispersed instantly. The alkali metal dichromate and sulfuric acid can be kneaded and mixed readily by virtue of this rotary action and the reaction between them can be consummated in a short interval of time.

The evaporator 8 includes a plurality of blades 19a equidistantly mounted on a rotor 19 keyed to the shaft 11 and projecting radially in several directions. The edge of each of the blades 19a is disposed in close proximity to the inner walls of the cylindrical casing 12, so that the reaction product is scattered by the blades 19a and lodged by centrifugal forces cylindrical inner surfaces of the stationary cylindrical casing 12 to form a thin film of the reaction product thereon. The thin film of the reaction product brought into contact with the inner walls of the stationary cylindrical casing 12 is heated by the heating medium passed along the outer wall surfaces of the stationary cylindrical casing 12 whereby the reaction product can be deaerated. At the same time, air bubbles in the reaction product in thin film form are broken as they are scratched by the blades at their edges. Thus, water vapor and gases are not permitted to remain in the reaction product which is deaerated in a very short interval of time.

The results of tests conducted with pilot reactors embodying the present invention are as follows:

EXAMPLE 1

The model reactor has an inner diameter of 160 millimeters and an effective length of 700 millimeters. The heating medium was heated to 270° C. Sodium dichromate anhydride with a purity of 98% and a chlorine content of 0.28% and sulfuric acid with a purity of 94% were supplied to the reactor at the rates of 63 kilograms and 49 kilograms per hour respectively so that they might react with each other. The reaction product was separated into its constituents in accordance with differences in specific gravity to provide chromic anhydride. The chromic anhydride obtained comprised 99.8% $CrO_3$, 0.01% Cl and 0.04% $SO_4$. The acid sodium sulfate contained 0.9% hexavalent chromium and 0.4% trivalent chromium.

EXAMPLE 2

The same sodium dichromate and sulfuric acid as used in Example 1 were supplied to the reactor of Example 1 at the rates of 50 kilograms and 41 kilograms per hour respectively, and the reactor was operated continuously for 20 hours by rotating the same at 300 r.p.m. It has been found that no scale formation of the raw material and the reaction product takes place nor is there any leakage of gases. The chromic anhydride produced compirses 99.6 to 99.8% $CrO_3$, 0.03 to 0.05% $SO_4$ and 0.01 to 0.02% Cl.

EXAMPLE 3

The reactor used in this test comprises a horizontal reaction cylinder having a heat conducting area of 0.3 square meters and rotated at 250 r.p.m., and a vertical centrifugal continuous evaporator having a heat conducting area of 0.32 square meter and rotated at 400 r.p.m. which is connected to said horizontal reaction cylinder. Dried sodium dichromate having a chromium content of 34.7% and sulfuric acid with a purity of 96% were supplied to the reactor at the rates of 80 kilograms and 54 kilograms per hour respectively. The reaction product was separated into its constituents in accordance with differences in specific gravity to provide chromic anhydride. The chromic anhydride obtained comprised 99.7% $CrO_3$, 0.01% Cl and 0.04% $SO_4$. The acid sodium sulfate contained 0.5% trivalent chromium.

No bubbling took place in the separator tank.

What I claim is:

1. A reactor apparatus for continuously producing chromic anhydride by reacting an alkali metal dichromate and sulfuric acid to produce a liquid product from which chromic anhydride is separated, said apparatus comprising (a) a conveying chamber having a high speed rotary conveyor which rotates about the longitudinal axis of said conveying chamber, (b) a reaction chamber having a high speed rotary kneader which rotates about the longitudinal axis of said reaction chamber, said reaction chamber being interconnected in end to end relationship with said conveying chamber, (c) means for externally heating said conveying chamber and said reaction chamber, (d) an alkali metal dichromate supply port opening to the conveying chamber, said alkali metal dichromate being conveyed by said rotary conveyor to said reaction chamber, (e) a sulfuric acid supply port and a reaction product withdrawal port opening to the opposite ends of said reaction chamber with the sulfuric acid port located at the end of said reaction chamber which is interconnected to said conveying chamber, whereby sulfuric acid is mixed and reacted with said alkali metal dichromate fed from said rotary conveyor, with said reaction mixture being conveyed along the longitudinal direction of said rotary kneader to said product withdrawal port, (f) a high speed, rotary, centrifugal, continuous evaporator housed in a stationary cylindrical casing adapted to be heated externally, said evaporator having inlet means for receiving the reaction product from said withdrawal port in said reaction chamber and a rotating member adapted to form a thin film of said reaction product on the cylindrical inner walls of said evaporator, said evaporator also having a reaction product discharge port and an exhaust port communicating with an exhauster.

2. Reactor apparatus as claimed in claim 1 wherein said conveying chamber, reaction chamber and rotary evaporator are axially arranged into an integral unit and said rotary conveyor, rotary kneader and rotating member of said evaporator are mounted on a common drive shaft which extends axially through said reactor apparatus.

3. Reactor apparatus as claimed in claim 1 wherein the conveying chamber and reaction chamber are axially arranged into an integral unit and said rotary conveyor and rotary kneader are mounted on a common drive shaft which extends axially through said reaction chamber and conveying chamber, with said rotary evaporator being arranged as a separate unit having independent means for driving said rotating member of said rotary evaporator.

References Cited

UNITED STATES PATENTS

| | | | |
|---|---|---|---|
| 3,230,042 | 1/1966 | Heinze et al. | 23—145 |
| 3,261,391 | 7/1966 | Gudheim | 159—6(WH) |
| 3,456,599 | 7/1969 | Baker | 259—10(X) |

JAMES H. TAYMAN, JR., Primary Examiner

U.S. Cl. X.R.

159—6WH; 23—145, 285; 259—9, 10